US012692389B1

(12) United States Patent
Bergad et al.

(10) Patent No.: US 12,692,389 B1
(45) Date of Patent: Jul. 28, 2026

(54) BIODEGRADABLE POLYURETHANE FOAM SLABSTOCK AND METHOD OF PRODUCTION

(71) Applicant: Bergad, Inc., Kittanning, PA (US)

(72) Inventors: Paul Bergad, Freeport, PA (US);
Coleman Bergad, Freeport, PA (US)

( * ) Notice: Subject to any disclaimer, the term of this patent is extended or adjusted under 35 U.S.C. 154(b) by 0 days.

(21) Appl. No.: 19/060,764

(22) Filed: Feb. 23, 2025

Related U.S. Application Data

(63) Continuation-in-part of application No. 18/943,032, filed on Nov. 11, 2024.

(Continued)

(51) Int. Cl.
| | |
|---|---|
| *C08L 75/04* | (2006.01) |
| *B29C 44/28* | (2006.01) |
| *C08J 9/00* | (2006.01) |
| *C08J 9/02* | (2006.01) |
| *C08J 9/12* | (2006.01) |

(Continued)

(52) U.S. Cl.
CPC ............ *C08L 75/04* (2013.01); *C08J 9/0061* (2013.01); *C08J 9/122* (2013.01); *B29C 44/28* (2013.01); *B29C 2793/009* (2013.01); *B29K 2075/00* (2013.01); *B29K 2105/04* (2013.01); *B29K 2995/006* (2013.01); *C08J 2203/06* (2013.01); *C08J 2367/04* (2013.01); *C08J 2375/04* (2013.01); *C08L 2201/06* (2013.01); *C08L 2203/14* (2013.01)

(58) Field of Classification Search
CPC .. C08L 75/04; C08L 2201/06; C08L 2203/14; C08J 9/0061; C08J 9/122; C08J 2203/06;

C08J 2367/04; C08J 2375/04; B29C 44/28; B29C 2793/009; B29K 2075/00; B29K 2105/04; B29K 2995/006

See application file for complete search history.

(56) References Cited

U.S. PATENT DOCUMENTS

2007/0191502 A1 * 8/2007 Free .................. C08G 18/7621
                                                    521/172
2007/0299151 A1 * 12/2007 Guelcher ............ C08G 18/428
                                                    521/67

(Continued)

FOREIGN PATENT DOCUMENTS

CA      3117760 A1 * 5/2021
JP      H07196763 A * 8/1995 ............. C08G 18/40

OTHER PUBLICATIONS

PEG-PCL Polycaprolactone BOC Sciences accessed Sep. 27, 2024.

(Continued)

*Primary Examiner* — K. B Boyle
(74) *Attorney, Agent, or Firm* — Karen Tang-Wai Sutton

(57) ABSTRACT

A biodegradable polyurethane foam comprised of components polyol, isocyanate, blowing agent, catalyst, surfactant, and a non-starch, polycaprolactone-based biodegradable solid additive equal to or no greater than 3% of the foam by weight has a same function and performance characteristic profile as a standard polyurethane foam made with the same components and percentages by weight but without the biodegradable solid additive and made using a continuous line pouring method. The biodegradable polyurethane foam has a same durability as the standard polyurethane foam but degrades into inert humus, carbon dioxide, and methane only when subject to landfill conditions.

13 Claims, 3 Drawing Sheets

Related U.S. Application Data

(60) Provisional application No. 63/627,382, filed on Jan. 31, 2024.

(51) Int. Cl.
*B29K 75/00* (2006.01)
*B29K 105/04* (2006.01)

(56) References Cited

U.S. PATENT DOCUMENTS

2018/0098679 A1* 4/2018 Gonzales ................ C08J 9/122
2020/0376158 A1* 12/2020 Moore ...................... C08J 5/18

OTHER PUBLICATIONS

PCL and PCL-based material sin biomedical applications, accessed Sep. 27, 2024 Elbay Malikmammadov Journal of Biomaterials Science, Polymer Edition.

Polyurethane Foam Association Form Performance accessed Oct. 14, 2024.

Biodegradation of renewable polyurethane foams in marine environments, accessed Feb. 4, 2025 Natasha R. Gunawan et. al.

* cited by examiner

BIODEGRADABLE POLYURETHANE FOAM SLABSTOCK AND METHOD OF PRODUCTION

CROSS-REFERENCE TO RELATED APPLICATIONS

R1 This application is a continuation in part of U.S. utility application Ser. No. 18/943,032 filed 11 Nov. 2024, which itself claims priority to U.S. provisional patent application Ser. No. 63/627,382 filed 31 Jan. 2024, whose disclosures are hereby incorporated by this reference.

STATEMENT REGARDING FEDERALLY SPONSORED RESEARCH OR DEVELOPMENT

NA

NAMES OF THE PARTIES TO A JOINT RESEARCH AGREEMENT

NA

INCORPORATION BY REFERENCE OF MATERIAL SUBMITTED ON A COMPACT DISC OR AS A TEXT FILE VIA THE EFS WEB SYSTEM

NA

STATEMENT REGARDING PRIOR DISCLOSURES BY THE INVENTOR OR A JOINT INVENTOR

NA

BACKGROUND OF THE INVENTION

Field of the Invention

The invention is a biodegradable polyurethane foam slabstock and method of manufacturing the same using a continuous line pouring method.

Background Art

Polyurethane foam is a known art, produced by a chemical reaction between polyols and isocyanates. The resulting polymer from this reaction has either an open or closed cellular structure. A flexible polyurethane foam has an open cellular structure that allows for compression and resilience and is commonly used for cushioning, soundproofing, filtration, and liquid control across many diverse industries. Over 1.5 billion pounds of polyurethane foam are produced and used every year in the U.S. alone.

Foam is commonly produced in large buns called slabstock, which cure into a stable solid material and then are cut and shaped into smaller pieces in a variety of sizes and configurations. In this disclosure, "bun" and "slabstock" are used interchangeably. Foam can be either made using a continuous or discontinuous process. For a continuous process, the foam components are continuously mixed and poured onto a conveyor belt where they immediately begin reacting by foaming into a large bun as they travel down the conveyor. This continuous pour process is efficient and suitable for manufacturing large amounts of foam at a time where the foam is a uniform thickness and can be cut in a desired shape from the cured slabstock. Discontinuous pour processes are used for small volume manufacturing, to manufacture products with differing thicknesses, and to produce custom or unique shapes.

All foam produced using continuous or discontinuous pour processes at some point outlive its designated purpose, becoming waste material. Since no polyurethane foam is biodegradable, disposing of the used foam is problematic. Foam cannot be recycled thus most used foam eventually will end up in landfills. It can be chopped into small particles to minimize volume in the landfill, but the foam nevertheless will not degrade. Some companies downcycle used foam, a process by which used foam is cut and used in less useful products, but these products also have a useful life and eventually they too will end up in a landfill.

Current attempts to make environmentally friendly foam using biodegradable materials have thus far been unsatisfactory as the resulting products sacrifice the look, feel and performance of the original, nonbiodegradable product. A major problem in the creation of a biodegradable foam having a long lifespan, such as foam used in a mattress or couch, is the prohibitively high cost of many biodegradable additives. Making foam is relatively easy, but making a biodegradable foam that maintains the same specific performance characteristics of standard foam has proven to be difficult. Not only is it difficult to reproduce standard foam performance characteristics when a biodegradable additive is included into the recipe, but the many unknowns regarding degradation have also resulted in no biodegradable foams suitable for long term use available in the marketplace. Most biodegradable products designed for more than a single use are predominantly made of naturally degradable components, such as cotton and wood fibers, and while biodegradable products with synthetic and semi-synthetic components such as plastics do exist, they still rely on naturally degradable components such as starches that are inexpensive and easy to use, but not designed for long term use. Still, despite the push towards sustainability and reduction of landfill waste, the reality is that only a fraction of products made with synthetic or semi-synthetic components that end up in landfills are biodegradable.

What is needed is a biodegradable foam that maintains the performance characteristics of a standard polyurethane foam and yet is biodegradable only when buried in a landfill. What is also needed is a method of manufacturing a biodegradable foam that is efficient and cost effective, requiring no major changes to the standard equipment now used to make standard polyurethane foams.

DISCLOSURE OF INVENTION

A slabstock of biodegradable polyurethane foam is comprised of a polyol, an isocyanate, a blowing agent either equal to or no more than 4% of the biodegradable polyurethane foam by weight, a catalyst either equal to or no more than 1% of the biodegradable polyurethane foam by weight, a surfactant either equal to or no more than 1% of the biodegradable polyurethane foam by weight, and a non-starch based biodegradable solid additive either equal to or no greater than 3% of the biodegradable polyurethane foam by weight. The biodegradable polyurethane foam maintains a same performance characteristic profile as a standard foam of a same composition minus the biodegradable solid additive, and only degrades when buried in a landfill, becoming inert humus, methane, and carbon dioxide within the landfill. The biodegradable polyurethane foam is either a polyester foam or a polyether foam.

In a first aspect of the invention, the biodegradable polyurethane foam uses a biodegradable solid additive that is a polycaprolactone-based additive. In some embodiments, the biodegradable solid additive is hydrophilic. In one embodiment, the biodegradable solid additive is 100% polycaprolactone by weight. In other embodiments, the biodegradable solid additive is comprised or consists of polyethylene glycol-polycaprolactone copolymers.

In a second aspect of the invention, the biodegradable polyurethane foam uses between 58-64% of polyol by weight in the biodegradable polyurethane foam.

In a third aspect of the invention, the biodegradable polyurethane foam uses between 31-34% of isocyanate by weight in the biodegradable polyurethane foam.

In a fourth aspect of the invention, the slabstock of biodegradable foam is made using a continuous pour method comprising the steps of measuring desired components by weight, mechanically mixing the desired components in a container to form a mixture, pouring the mixture onto a conveyor belt at a controlled rate to form a bun, and curing the bun on the conveyor belt. The desired components include a biodegradable solid additive that is equal to or no more than 3% by weight of the desired components and either a catalyst or a surfactant equal to or less than 1% by weight of the desired components. In another embodiment, further steps of cutting the cured bun and removing the cut and cured bun pieces from the conveyor belt after the step of curing are included in the method. The biodegradable solid additive used in another embodiment is comprised of polycaprolactone.

In yet another aspect of the invention, the method includes using a quantity of carbon dioxide or water as a blowing agent.

In yet another aspect of the invention, the method includes using 58-64% polyol by weight.

BRIEF DESCRIPTION OF THE DRAWINGS

The features and advantages of the invention will become apparent from a consideration of the subsequent detailed description presented in connection with accompanying drawings, in which.

DRAWINGS LIST OF REFERENCE NUMERALS

Figure 1:
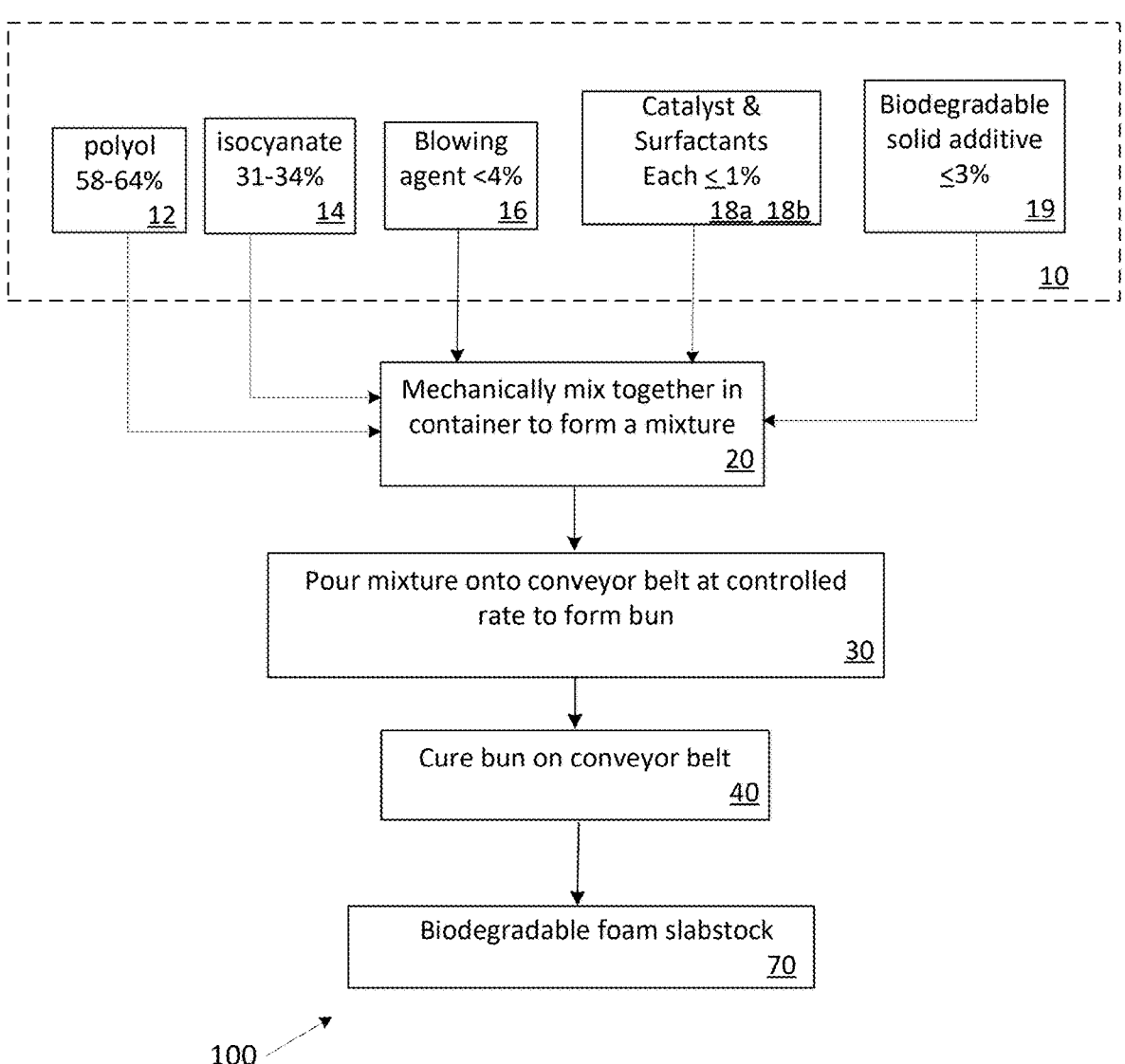
FIG. 1 is a flow diagram of a series of steps for manufacturing a biodegradable foam slabstock.

The following is a list of reference labels used in the drawings to label components of different embodiments of the invention, and the names of the indicated components:

100 continuous pour method or method
10 foam components
12 polyol
14 isocyanate
16 blowing agent
18*a* catalyst
18*b* surfactant
19 biodegradable solid material or biodegradable solid additive or biobug
20 first step or step of mixing

30 second step or step of pouring
40 third step or step of curing
50 fourth step or step of cutting
70 slabstock of biodegradable foam or biodegradable foam slabstock or biodegradable foam
200 degradation of biodegradable foam
210 degradation of biodegradable foam
220 degradation of nonbiodegradable foam control sample
230 cellulose
240 high density polyethylene

DETAILED DESCRIPTION

Figure 3:
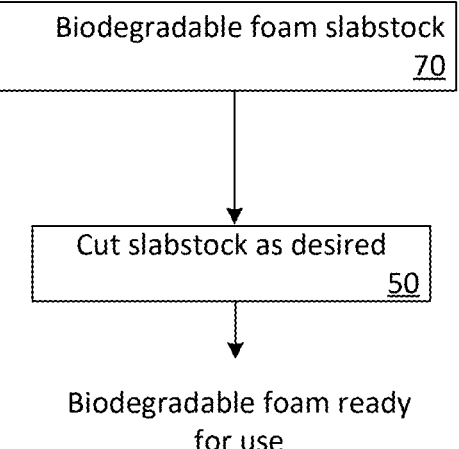
FIG. 3 is an optional step for processing the biodegradable foam slabstock after the method steps in FIG. 1 are performed.

A continuous pour method or method 100 of manufacturing a slabstock of biodegradable foam or biodegradable foam slabstock or biodegradable foam 70 is shown in FIG. 1 in a representative embodiment for the production of polyurethane foam, and with an optional cutting method step 50 shown in FIG. 3. The manufacturing of polyurethane foam, including polyether and polyester foams, is a known art, and the disclosed recipe in FIG. 1 is a representative recipe to illustrate the method 100 of making the biodegradable foam 70 and is not intended to limit the method 100 or the resulting biodegradable foam 70 to only the recipe provided.

Turning to FIG. 1, in a first step 20, measured quantities by weight of foam components polyol 12, isocyanate 14, blowing agent 16 (typically water or carbon dioxide), surfactants 18*b*, catalyst 18*a* and a biodegradable solid material or biodegradable solid additive or biobug 19 are combined and mechanically mixed in a container to form a mixture. In one embodiment of the first step 20, the polyol 12 and the biobug 19 are first blended together prior to adding the other components 14 16 18*a* 18*b*. The components are typically mixed in the container using a mechanical paddle. The percentages of each component provided in FIG. 1 reflect the representative recipe and are not meant to limit the foam components to just what is shown. The biobug 19 is used in either a powdered or pelletized form, with the individual particles or pellets having a uniform size and shape. In the representative embodiment according to the invention, the biobug 19 has a particle size ranging from 200-400 microns, equating to approximately 70-40 mesh size with an average size of about 300 microns using a closest mesh size of 50. To be clear, the biobug 19 used in each foam pour batch has a uniform particle size and shape, Hence if the biobug 19 with a particle size of 200 microns is used, all the biobug 19 particles would have this same 200 micron size a same foam pour batch, rather than having particles ranging from 200-400 microns in the same pour batch. Further, as a mesh size of 50 equates to 297 microns, in this disclosure the term "300 microns" means a micron range of 297-300 microns, corresponding with a 50 mesh size.

In a second step 30, the mixture is poured at a desired controlled rate onto a conveyor belt, forming a uniform bun or slabstock on the conveyor belt, which rises and cures as it travels down the conveyor belt. The cured bun or slabstock is the biodegradable foam 70.

In a third step 40, shown in FIG. 3, the biodegradable foam 70 is cut into pieces and is now ready for use making other products or for packaging to send to other processors for making products using the foam 70. This step is optional since the slabstock size of the biodegradable foam 70 can be controlled by a foam manufacturer and thus can be transported whole to another facility where it is then cut or otherwise processed and thus the third step 40 may be performed by others and not the foam manufacturer.

The biodegradable foam 70 has all the same performance characteristic profile as a standard polyurethane foam made without the biobug 19, except that when the biodegradable foam 70 is discarded and buried in a landfill, the biobug 19, now subject to landfill conditions, is activated and causes the biodegradable foam 70 to degrade. The term "performance characteristic profile" in this disclosure means measurable physical properties of the foam, including density, firmness (indentation force deflection or IFD), support factor (compression modulus), lifespan/durability (dynamic fatigue), tear strength, resilience, air flow, moisture resistance, and other standard measurements used in the foam industry to grade and sort standard polyurethane foams. The phrase "same performance characteristic profile" in this disclosure means the key measurable physical properties, particularly durability, are indistinguishable or with a range of accepted variation as compared to a same type of standard polyurethane foam. The inventors note that for some types of biodegradable foam, there is a slight texture difference between the foams only noticeable when a direct texture comparison is performed and would otherwise be unnoticed. The method shown in FIG. 1 does not require the foam manufacturer to use any unique or otherwise specialized equipment to make the biodegradable foam 70, thus allowing the foam manufacturer to easily convert standard continuous pour foam production to that of biodegradable foam pours.

Figure 2:
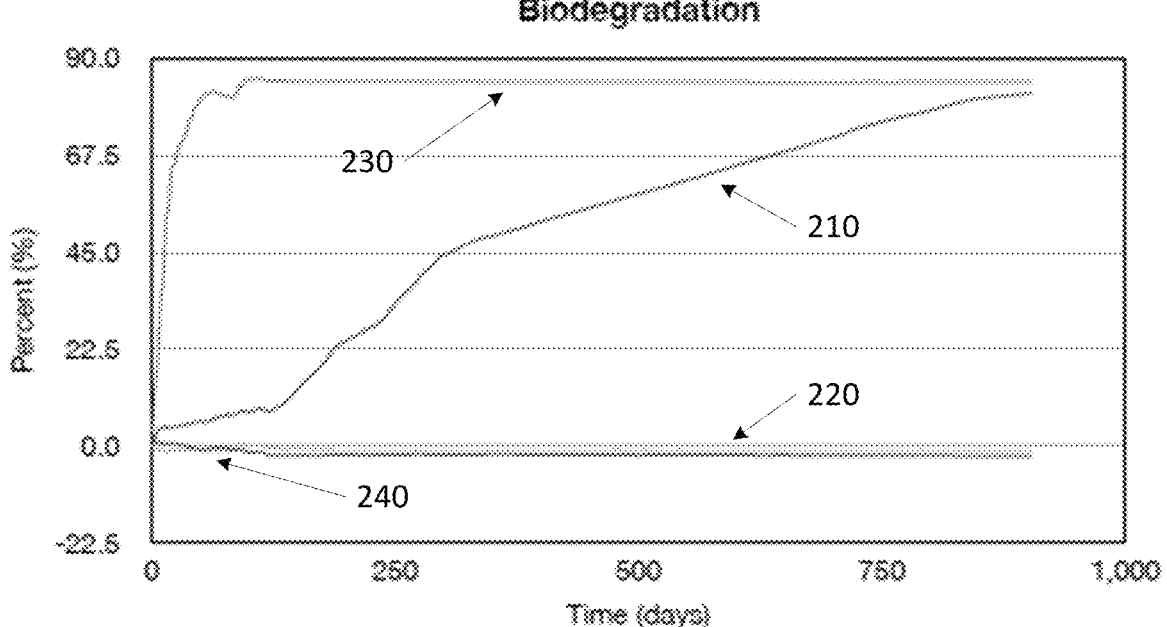
FIG. 2 is a line graph comparing the decomposition of a quantity of the biodegradable foam slabstock manufactured using the method and a same quantity of standard polyurethane foam under simulated landfill conditions.
Figure 2:

The inventors tested the biodegradable foam 70 made using the method shown in FIG. 1 in a simulated landfill, using the pressures, moisture level, and bacteria commonly found in landfills. Test results are shown in FIG. 2. A biodegradable material used for the degradation control during testing was cellulose 230, the chart in FIG. 2 showing it was over 85% degraded by 125 days. High density polyethylene 240 was used as the non-degradation control material and was essentially unchanged after 712 days. Standard polyurethane yellow foam 220 is shown unchanged after 712 days in the simulated landfill conditions. The inventors' biodegradable foam 70 however was about 83% decomposed after 712 days.

The biobug 19 used in the representative embodiment shown in FIG. 1 of the inventors' method 100 is comprised of a hydrophilic polycaprolactone-based additive and importantly, is not starch based as with other prior art methods and products. However, the term "biobug" used in this disclosure is not limited to polycaprolactone-based additives and may be any biodegradable additive except starch that preserves the function and physical properties of the foam while degrading only when subjected to landfill conditions. The inventors note that commercially there are many biodegradable additives available on the market, however the manufacturing of a true biodegradable polyurethane foam that retains all the desirable properties and function of standard, nonbiodegradable foam has been elusive thus far.

Polycaprolactone is a hydrophobic, slow-degrading, synthetic polymer making it particularly interesting for the preparation of long-term implantable devices and a variety of drug delivery systems in the prior art. Polycaprolactone has an average density of 1.145 $g/cm^3$ at 25° C., slightly higher than that of water at 1 g/cm. An example of a hydrophilic polycaprolactone suitable for use with the method 100 is PEG-PCL, a copolymer of hydrophilic polyethylene glycol and hydrophobic polycaprolactone.

Surprisingly, inclusion of the hydrophilic polycaprolactone-based additive in the representative embodiment in the manufacturing process in FIG. 1 does not change the properties of the resulting foam product 70. Hence the biodegradable foam 70 can be exposed to moisture and temperature changes, reacting in a same way as a nonbiodegradable standard foam of a same type, that is, not decomposing under normal use conditions. Rather, the biodegradable properties of the biobug 19 are activated only when the biodegradable foam 70 is buried in a landfill, where the biobug 19 helps breaks down the foam 70 into inert humus, methane, and carbon dioxide. The methane and carbon dioxide gases can be recaptured, but most importantly, the biodegradable foam 70 itself has been effectively degraded.

In step one 20 of the method, the inventors note that the addition of 3% or less by weight of the biobug 19 to the foam components 12 14 16 18a 18b created a biodegradable foam 70 slabstock that retained all the usual performance characteristics of a standard polyurethane foam such that the performance characteristic profile i.e. the physical properties of the biodegradable foam 70, including density, porosity, compressibility, flexibility, etc., is indistinguishable from nonbiodegradable standard foam. Recipes for viscoelastic foams, open and closed cell foams as well as polyurethane gels made using the method 100 described in this disclosure or variations thereof by incorporating the biobug 19 as shown in FIG. 1 are indistinguishable from regular nonbiodegradable viscoelastic foams, open and closed cell foams, and polyurethane gels. The inventors note that the making of standard open and closed cell foams, viscoelastic foams, and gels are known in the prior art, but the prior art neither teaches nor suggests the addition of the biobug 19 to make biodegradable versions of the standard foams and gels of the prior art.

Thus, the inventors' method 100 and biodegradable foam 70 produces foam that is otherwise indistinguishable from standard, nonbiodegradable foam when in use and for the life of the foam. The biobug 19 is a solid material added to the foam components 12 14 16 18a 18b so as to create a slurry mixture. The inventor notes that up to 20% of the biobug 19 by weight can be added in the first step 20 without any noticeable negative effect on the resulting foam product, however it does not improve the biodegradability of the foam and thus less than or equal to 3% by weight of the biobug 19 is the smallest, effective amount that can be used. Thus, use of more than 3% of the biobug 19 is wasteful in that it increases the cost of producing the foam without any further biodegrading benefit. These percentages are based on the inventors' own testing as there is no guidance anywhere as to how to use the biobug 19 for his intended purpose of creating foams for long term use having all the usual characteristics of standard foam, but one that will degrade only when buried in a landfill.

The inventors are specialty foam manufacturers and formulators and experts in their field. They are unaware of the foam industry using the biobug 19 or any other biodegradable material to make biodegradable foam. An ideal biodegradable foam must be able to perform for the lifespan of the product and then degrade quickly once its useful lifespan is over, with the degradation process only starting when the product is subject to landfill conditions.

While the biobug 19 used in the representative embodiment, that is, the hydrophilic polycaprolactone-based additive, is a known biodegradable polyester material, it has significant drawbacks. Notably, polycaprolactone is biodegradable via hydrolysis of its ester linkages, which on its face makes the biobug 19 unattractive in any use where the product has a longer relative useful lifespan and where normal use of the product cannot eliminate or otherwise control moisture exposure. The biobug 19 is also known for a slow rate of degradation, hence is ideal for a product with a longer lifespan, however determining the lifespan of any product using the biobug 19 is difficult if degradation is moisture dependent and ordinary use may result in variable moisture exposure depending on season and climate where the biodegradable foam 70 is used. Significant moisture exposure may increase the rate of degradation and compromise the foam's performance characteristics long before its stated life is over, leading to warranty issues for the manufacturer. Hence use in medical devices is much more predictable since conditions within a human body are far less variable.

Another main drawback is that the biobug 19 in the representative embodiment is an expensive additive, and coupled with the slow rate of degradation, other non-foam industries have combined the biobug 19 with starches to improve its degradation as well as lower its cost. Starches are not suitable for inclusion in products such as seat cushions and mattresses, and the cost of the biobug 19 can be prohibitively expensive and as such are typically only used in relatively high price items. Thus, the characteristics of the biobug 19 have been most suited for use in the biomedical industry, for implantable sutures and drug delivery systems that can command higher prices and are relatively small so use little of the biobug 19. Given the commercial concerns around biodegradable products, industries are motivated to use inexpensive biodegradable components that make up the bulk of the product, and thus the market has limit biodegradable products to items that are typically single or short term use only.

Given the known characteristics of the biobug 19 and the challenge of using it in products having a longer lifespan, it was unclear to the inventors whether incorporating relatively small amounts of the biobug 19 with non-biodegradable components would nevertheless result in a completely biodegradable foam 70 that degrades quickly when desired, and all without negatively affecting the performance qualities of the foam as compared with standard foams.

While it is tempting to reason that small quantities of an additive are unlikely to affect the overall characteristics of a polyurethane foam, foam recipes can be extremely specific and seemingly small changes to the recipe can drastically change the characteristics of the resulting foam. For instance, the catalyst 18a is less than or equal to just 1% by weight of the foam components, and yet it is well known in the chemical arts that use of a catalyst can have profound effects on the reaction. Thus, changes to the components of the foam and their relative percentages may result in a significantly different foam product with desired or undesired properties.

In the foam industry, testing is everything and it is not always clear prior to testing as to how any given additive will affect the final result and what percentages of those additives are needed. The inventor invested significant resources into testing various biodegradable additives, before determining the biobug 19 at 3 percent or less by weight of the foam components resulted in a biodegradable foam 70 whose physical properties and performance were indistinguishable from nonbiodegradable foam of a same type, yet rapidly degraded when buried in a landfill.

The inventor believe their method and the resulting biodegradable foam 70 balance economic, performance and environmental concerns. Turning to FIG. 2, the biodegradable foam 70 made using the method 100 described herein is stable under normal use conditions, including exposure to moisture, but when placed under landfill conditions, where the biodegradable foam 70 is exposed to persistent elevated temperatures and moisture, the foam decomposes. At 750 days, the control standard polyurethane foam 220 showed no signs of decomposition, but the biodegradable foam 70 produced using the method disclosed herein was about 75% degraded, shown as callout 210. At about 900 days, the biodegradable foam 70 was about 85% degraded, while the control foam still retained its properties. The inventors believe their biodegradable foam and method of making the same are unique and will revolutionize the foam industry and the products with foam components. The effective amount of biobug 19 used in the inventors' foam allow them to create foam products at every price level and allow the degradation of the foam to be controlled, only after it is committed to a landfill.

It is to be understood that the above-described arrangements are only illustrative of the application of the principles of the present invention. Numerous modifications and alternative arrangements may be devised by those skilled in the art without departing from the scope of the present invention. All references to bun and slabstock mean the biodegradable foam product created as a result of the method described herein.

The method is equally useful making biodegradable polyester foams as well the polyether foam in the representative embodiment, and thus references to either type of foam is for purposes of the representative embodiment and is not meant to limit the method or the resulting biodegradable foam made using this process to a specific type of foam. Polyester and polyether foams are specifically included as being part of this disclosure and invention. To be clear, the term "polyurethane foam" and "biodegradable polyurethane foam" includes both polyester and polyether based foams.

Gels, which traditionally are "failed" foams in that they do not expand, are also included in the term "biodegradable foam" as they are made using the same equipment and components, but without blowing agents.

In particular, the use of the biobug 19 in polyether foams made by the inventors using the method described herein was impressive and surprising, given that polyether foams are much more durable when exposed to moisture and it was uncertain whether the addition of the biobug 19 to the polyether foam would be detrimental to the foam's properties during its useful life, or whether the moisture-resistance of the polyether foam would otherwise hinder degradation of the foam once buried in a landfill.

We claim:

1. A biodegradable polyurethane foam, comprising:

a polyol;

an isocyanate;

a blowing agent either equal to or no more than 4% of the biodegradable polyurethane foam by weight;

a catalyst either equal to or no more than 1% of the biodegradable polyurethane foam by weight;

a surfactant either equal to or no more than 1% of the biodegradable polyurethane foam by weight; and a hydrophilic biodegradable solid additive either equal to or no greater than 3% of the biodegradable polyurethane foam by weight;

wherein the hydrophilic biodegradable solid additive includes polyethylene glycol-polycaprolactone copolymers;

wherein the biodegradable polyurethane foam using the hydrophilic biodegradable solid additive has a same performance characteristic profile as a polyurethane foam of a same composition but made without the hydrophilic biodegradable solid additive;

wherein the performance characteristic profile of the biodegradable polyurethane foam compared to that of the polyurethane foam made without the hydrophilic biodegradable solid additive includes measurements of density, texture, durability, and support factor;

wherein the hydrophilic biodegradable solid additive is non-starch based;

wherein the hydrophilic biodegradable solid additive has a particle size greater than or equal to 200 microns and less than 400 microns;

wherein the hydrophilic biodegradable solid additive is activated only when the biodegradable polyurethane foam is buried in a landfill; and wherein the biodegradable polyurethane foam is at least 70% degraded into inert humus, methane and carbon dioxide within the landfill after 900 days.

2. The biodegradable polyurethane foam in claim 1, wherein the biodegradable polyurethane foam is either a biodegradable polyester foam or a biodegradable polyether foam.

3. The biodegradable polyurethane foam in claim 1, wherein the biodegradable polyurethane foam is either a biodegradable viscoelastic foam, a biodegradable open cell foam, or a biodegradable closed cell foam.

4. The biodegradable polyurethane foam in claim 1, wherein the polyol is between 58-64% of the biodegradable polyurethane foam by weight.

5. The biodegradable polyurethane foam in claim 1, wherein the isocyanate is between 20-45% of the biodegradable polyurethane foam by weight.

6. A method of making the biodegradable polyurethane foam in claim 1 as a slab stock using a continuous pour method, comprising the steps of:

measuring the polyol, the isocyanate, the blowing agent, the catalyst, the surfactant, and the hydrophilic biodegradable solid additive;

mechanically mixing the polyol, the isocyanate, the blowing agent, the catalyst, the surfactant, and the hydrophilic biodegradable solid additive in a container to form a mixture;

pouring the mixture onto a conveyor belt at a controlled rate to form a bun; and curing the bun on the conveyor belt.

7. The method in claim 6, wherein the biodegradable solid additive is either in a powdered or a pelletized form.

8. The method in claim 6, wherein the hydrophilic biodegradable solid additive is in a powdered or pelletized form with a particle size of 300 microns.

9. The method in claim 6, further comprising the steps of:

cutting the cured bun; and removing the cut and cured bun pieces from the conveyor belt, after the step of curing.

10. The method in claim 6, wherein the hydrophilic biodegradable solid additive consists of polyethylene glycol-polycaprolactone copolymers.

11. The method in claim 6, wherein the blowing agent comprises carbon dioxide.

12. The method in claim 6, wherein the blowing agent comprises water.

13. The method in claim 6, wherein the polyol is present in an amount of 58-64% by weight of the polyurethane foam.

* * * * *